July 24, 1923.
H. B. LINDSAY
INSULATING WALL
Filed April 5, 1922
1,462,648
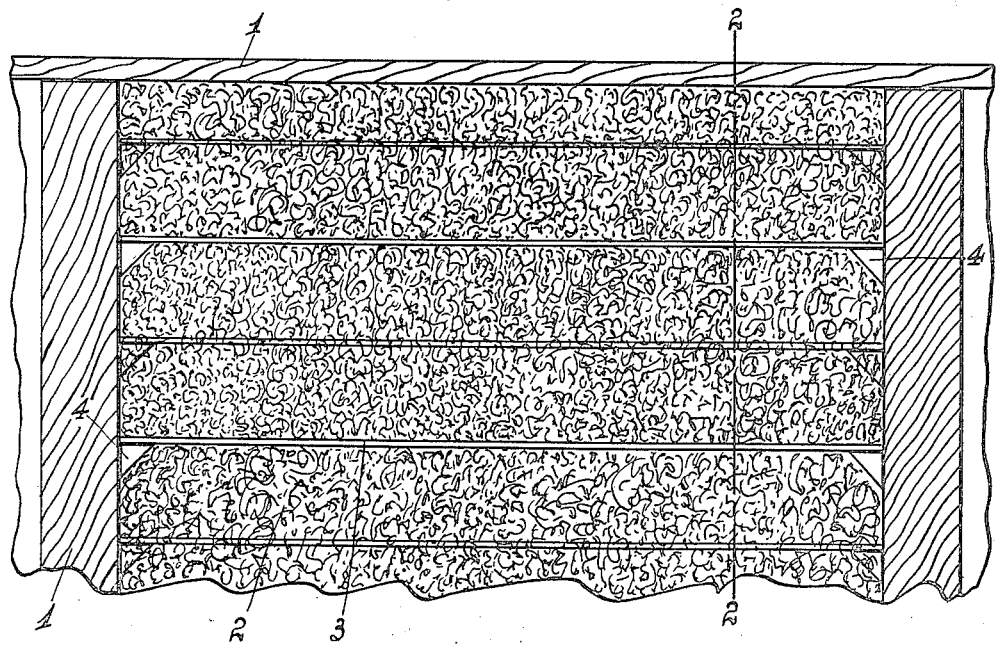
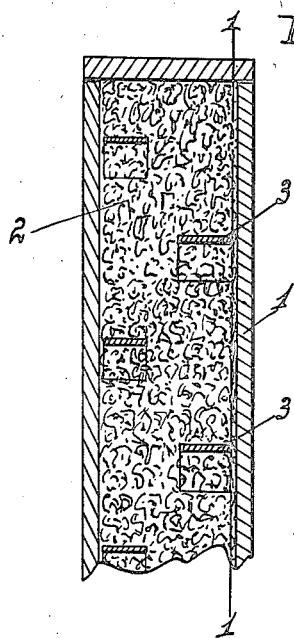
Inventor
Harvey B. Lindsay.

Patented July 24, 1923.

1,462,648

UNITED STATES PATENT OFFICE.

HARVEY B. LINDSAY, OF OAKLAND, CALIFORNIA, ASSIGNOR TO THE DRY-ZERO CORPORATION, OF OAKLAND, CALIFORNIA, A CORPORATION OF CALIFORNIA.

INSULATING WALL.

Application filed April 5, 1922. Serial No. 549,795.

*To all whom it may concern:*

Be it known that I, HARVEY B. LINDSAY, a citizen of the United States, residing at Oakland, in the county of Alameda and State of California, have invented certain new and useful Improvements in Insulating Walls, of which the following is a specification.

My invention is an improved insulating wall, particularly useful for refrigerators, which comprises a most effective insulating material and anchor means for sustaining the material so that it will not pack down, particularly when the wall is subjected to vibration.

Referring to the annexed drawing in which my invention is illustrated and which forms a part of this specification:

Figure 1 is a vertical longitudinal section of my wall taken on line 1—1 of Figure 2.

Figure 2 is a transverse vertical section of my wall taken on line 2—2 of Figure 1.

In the drawing 1 indicates the wall casing, preferably made of wood, which casing is filled with a packing of insulating material 2, preferably such material as that known as "kapok". On the inside of the walls of casing 1 are placed a plurality of superimposed horizontal anchor bars 3, of a width less than the width of the casing, the bars adjacent the inner wall of said casing being staggered with relation to the bars adjacent the outer wall thereof, said bars being supported at their ends upon brackets 4 secured to the inside of the end walls of the casing.

The bars 3 sustain the packing maintaining its fibre homogenous in density and without air channels through it and holding it in this condition, so that it will not pack down and leave the fatal open channels through it.

Having described my invention, I claim:

1. An insulating wall including a wall casing, a packing of kapok in said wall and horizontal superimposed anchor bars in said casing adjacent the side walls thereof.

2. An insulating wall including a wall casing, a packing of kapok in said wall and horizontal superimposed anchor bars in said casing adjacent the side walls thereof, the bars adjacent the inner walls of the casing being staggered with relation to bars adjacent the outer wall thereof.

3. An insulating wall including a wall casing, a packing of kapok in said casing, and anchor bars in said casing for sustaining said packing.

4. A heat-insulating and sound-deadening wall containing a vegetable fibre known as kapok, in combination with anchoring means therein, such means being fixed with respect to the exterior faces or casing of said wall.

5. A heat insulating wall containing a vegetable fibre known as kapok.

6. A single heat insulating compartment having anchor bars extending alternately from opposite walls a short distance into the compartment in staggered relation and disposed parallel to the walls of the compartment to prevent the settling of the insulating material.

In testimony whereof I affix my signature.

HARVEY B. LINDSAY.